United States Patent [19]
Matsui et al.

[11] Patent Number: 6,007,451
[45] Date of Patent: Dec. 28, 1999

[54] START CONTROL SYSTEM FOR VEHICLE WITH RUNNING ELECTRIC MOTOR

[75] Inventors: Hideaki Matsui; Yutaka Taga, both of Aichi-ken, Japan

[73] Assignee: Toyota Jidosha Kabushiki Kaisha, Toyota, Japan

[21] Appl. No.: 08/838,529

[22] Filed: Apr. 9, 1997

[30] Foreign Application Priority Data

Apr. 22, 1996 [JP] Japan .................................. 8-124058
Jul. 24, 1996 [JP] Japan .................................. 8-213170

[51] Int. Cl.$^6$ ...................................................... B60K 6/02
[52] U.S. Cl. ............................. 477/19; 477/99; 74/483 R
[58] Field of Search .................................. 477/3, 15, 19, 477/99; 74/473.21, 473.24, 483 R; 180/65.2, 65.4, 65.7

[56] References Cited

U.S. PATENT DOCUMENTS 5,018,610  5/1991  Rolinski et al. .................. 74/483 R X
5,379,871  1/1995  Asano et al. ...................... 74/483 R X
5,722,502  3/1998  Kubo .................................... 180/65.4

FOREIGN PATENT DOCUMENTS

A-6-319210  11/1994  Japan .

*Primary Examiner*—Charles A. Marmor
*Assistant Examiner*—Sherry Lynn Estremsky
*Attorney, Agent, or Firm*—Oliff & Berridge, PLC

[57] ABSTRACT

A start control system for a vehicle comprising: an electric motor brought into a starting state when an ignition key is operated to a starting position; an automatic transmission; and a shift unit having running ranges including drive, second speed, first speed and reverse ranges, and non-running ranges including parking and neutral ranges. Further comprised is a mechanism for allowing the shift unit to change the parking range to the drive range when the ignition key is operated to the starting position.

16 Claims, 7 Drawing Sheets

| IGN. KEY POSITION | HVECU POWER | INVERTER POWER | MOTOR START | OIL PUMP POWER | REMARKS |
|---|---|---|---|---|---|
| LOCK | OFF | OFF | NO | OFF | |
| ACC. | OFF | OFF | NO | OFF | |
| ON | ON | OFF / ON* | NO / OK | ON | *ON AFTER KEYED TO ST. POSITION |
| ST. | ON | ON | OK | ON | |

START CONTROL SYSTEM FOR VEHICLE WITH RUNNING ELECTRIC MOTOR

BACKGROUND OF THE INVENTION

1. Field of the Invention

The present invention relates to a system for controlling the start of a vehicle having a running electric motor, such as a hybrid car having an electric motor (as will be shortly called the "motor") and an internal combustion engine or an electric car. More particularly, the present invention relates to a start control system for a vehicle having an automatic transmission capable of changing a non-running range and a running range.

2. Related Art

The internal combustion engine using a fossil fuel such as gasoline is troubled by the exhaust gases or noises, and the fossil fuel itself has a fear of future exhaustion. In recent years, therefore, there has been developed a vehicle which uses electricity as its drive energy. One example is an electric car of the type in which a battery is mounted to drive the motor with its electric energy. Another is a hybrid car which has the internal combustion engine (as will be shortly called the "engine") and the electric motor (or motor).

The former electric car is restricted in the running performance and the carrying capacity due to the battery having a large size and a heavy weight. Another item to be improved is that the range of the driving length to be covered by one charge is limited. In the latter hybrid car, on the other hand, the engine per se can be used not only for the drive but also for generating an electric power to charge the battery while the car is running. These advantages makes this car sufficiently practical under the running circumstances and for the applications.

One hybrid car of this kind is disclosed in JPA6-319210. This hybrid car is constructed such that an automatic transmission connected to an engine is equipped therein with a clutch for selectively connecting a torque converter and a speed change gear mechanism, and such that a motor having a rotor connected to a member integrated with an input shaft is mounted in the automatic transmission.

Generally, the automatic transmission is constructed to set a gear stage by employing a load, as expressed by an accelerator opening, and a vehicle speed as its parameters. At the time of a start from the stopped state, a first speed having the highest gear ratio is automatically set. Thus, if the automatic transmission is set to a running range while the engine is in the stopped state and if the prime mover such as the engine is activated, the car is so driven simultaneously as the automatic transmission is set to the first speed that it starts the run simultaneously with the start of the prime mover.

In order to prevent this situation, there is provided in the prior art a shift lock mechanism for allowing a shift unit of the automatic transmission to make a shift from the non-running range to the running range only if the release condition including the depression of the brake is satisfied.

In the electric car or the hybrid car, however, a controller such as an inverter is brought into a starting state (or standby state) by a starting operation using an ignition key, but the motor is not rotated before the accelerator is operated, so that it is not rotated by the starting operation only. This makes it hardly necessary for the hybrid car, as disclosed in the aforementioned Laid-Open, or the existing general electric car or hybrid car to have a shift lock mechanism, even if it is equipped with the automatic transmission. The Laid-Open itself has failed to disclose the shift lock.

In the case of running with the motor, however, in the so-called "standby state" before the start of the running, only the controller is electrically acting, but no part is performing the mechanical action such as rotation. This makes it impossible to decide whether or not the car is in the standby state on the basis of at least the noises or vibrations. If the starting operation is unavailable even by inserting the key, therefore, it may not be perceived that the vehicle is not in the standby state, before the vehicle is not started even by depressing the accelerator pedal. If, in this case, the key is operated to the starting position, the vehicle may be advanced simultaneously with the key operation, because it is in the accelerator ON state.

In the prior art, on the other hand, there is provided an inhibitor mechanism for preventing the start of the running simultaneously with the start of the driving power source. This inhibitor mechanism is constructed to allow the start of the driving power source while the shift unit of the automatic transmission is set in the non-running range, only if the ignition key is operated from an insertion position (for locking) through an intermediate position (for accessory ON) to a starting position (for starting). Incidentally, the ignition key is further constructed such that it is automatically returned to the intermediate position after operated to the starting position.

In the vehicle employing the motor as its driving power source, however, the controller such as the inverter is brought into the starting state (or standby state) by operating the ignition key to the starting position, but the motor itself is not rotated before the accelerator pedal is depressed. In other words, the motor will not perform any mechanical action such as rotations to cause neither noises nor vibrations when the ignition key is merely operated to the starting position.

When the ignition key is in the intermediate position, it is therefore difficult to discriminate whether the ignition key is returned to the intermediate position after operated to the starting position or not operated to the starting position but is stopped in the intermediate portion.

With the ignition key being in the intermediate position, moreover, it may occur that the vehicle is not run even by changing the shift unit to the running range and by depressing the accelerator pedal, and that it is not found before this state that the motor is not controlled in the standby state.

With the aforementioned inhibitor mechanism being provided in this case, the driving power source is not started even by operating the ignition key to the starting position in the running range. If the aforementioned situation occurs, therefore, the vehicle cannot be started unless the ignition key is operated to the starting position once the shift unit is returned to the non-running range and unless the shift unit is changed again to the running range. As a result, the operations are complicated to raise a problem that the start of the vehicle is delayed.

SUMMARY OF THE INVENTION

A main object of the present invention is to provide a start control system capable of mechanically compensating the basic operating procedure of the key operation and the shifting operation in a vehicle having a running electric motor.

Another object of the present invention is to provide a vehicular start control system capable of controlling the electric motor in a standby state by simple operations even when the ignition key is not operated to a starting position.

According to an aspect of the present invention, there is provided a start control system for a vehicle having a running electric motor, which system comprises: an electric motor brought into a starting state when an ignition key is operated to a starting position; an automatic transmission connected to the output side of the electric motor; and a shift unit for changing the automatic transmission between a non-running range and a running range. The start control system is constructed such that the shift lock of the shift unit from the non-running range to the running range is released when the ignition key is operated to the starting position.

As a result, when the ignition key is operated to the starting position, the electric motor comes into the starting state, which is detected by start detecting means so that shift lock control means enables the shift unit to shift from the non-running range to the running range. Specifically, the accelerating operation for starting the electric motor is satisfied by operating the ignition key to the starting position, and then the shift to the running range can be performed so that the basic procedure in a series of operations from the key operation to the shift operation can be mechanically compensated.

According to another feature of the present invention, there is provided a start control system for a vehicle having a running electric motor, comprising: an electric motor for running the vehicle; an automatic transmission connected to the output side of the electric motor; a shift unit for changing the automatic transmission between a non-running range and a running range; and an ignition mechanism having an insertion position for receiving an ignition key, a starting position for controlling the electric motor in a standby state, and an intermediate position between the insertion position and the starting position. Further comprised is electric motor control means for controlling the electric motor in the standby state when the ignition key is operated to the intermediate position and when the shift unit is changed to the running range. Here, the "standby state of the electric motor" implies the state in which the output shaft is rotated to output the torque by depressing the accelerator pedal.

Thus, even while the ignition key is not operated to the starting position, the electric motor is controlled in the standby state if the ignition key is operated to the intermediate position and if the shift unit is changed to the running range. As a result, the redoing of the range changing operation of the shift unit and the operation of the ignition key can be omitted to output the torque from the output shaft of the electric motor by the simple operation of depressing the accelerator pedal thereby to start the vehicle promptly.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention.

DETAILED DESCRIPTION OF THE PREFERRED EMBODIMENT

Figure 4:
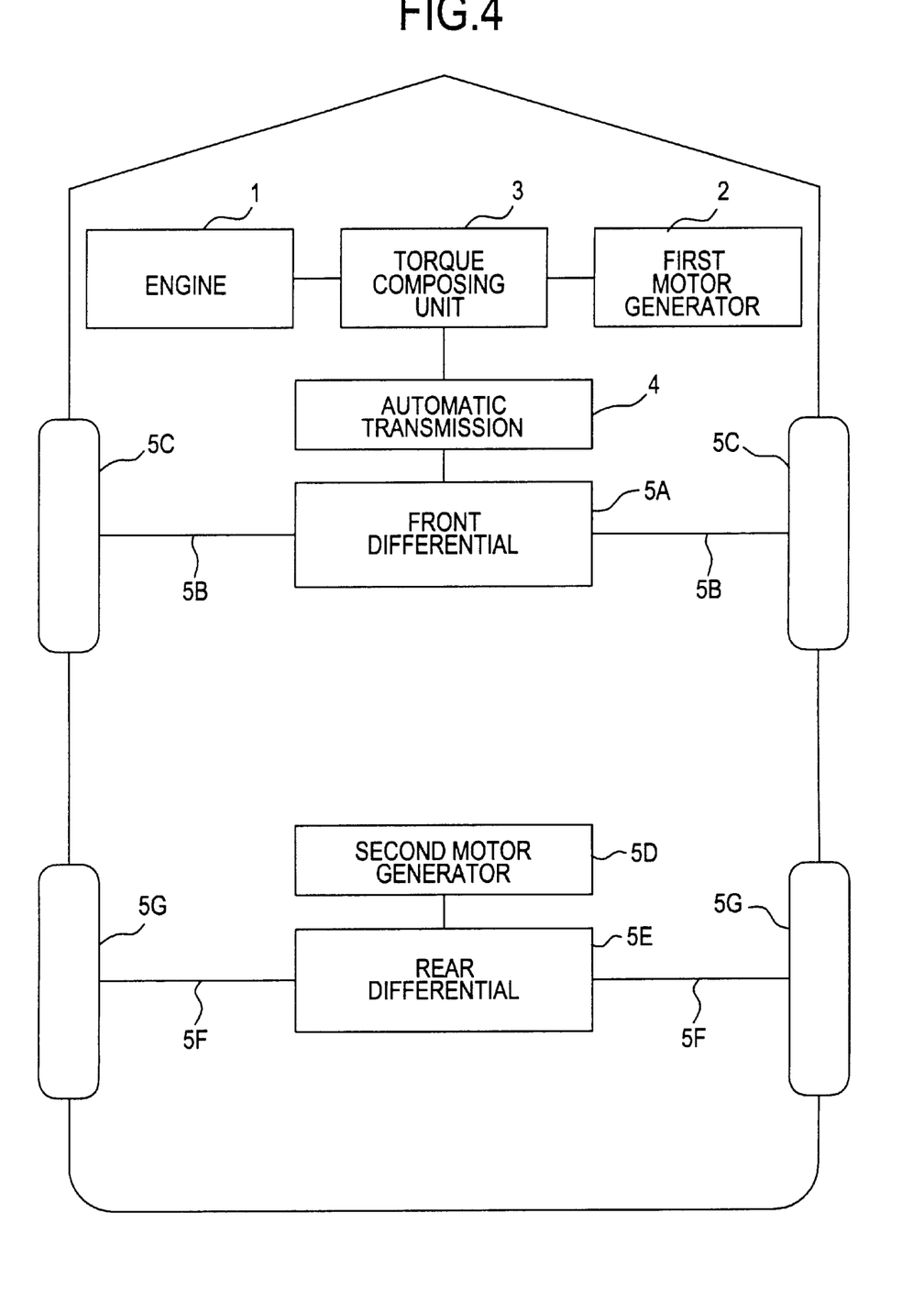
FIG. 4 is a top plan view showing a schematic construction of a hybrid type electric car according to one embodiment of the present invention.

A specific embodiment of the present invention will be described with reference to the accompanying drawings. FIG. 4 is a conceptional diagram showing a drive train of a hybrid type electric car according to the present invention. A four-wheel drive is adopted in the electric car, as disclosed herein.

On the front portion of the vehicle, there are mounted as a driving power source an engine 1 and a first motor generator 2. The engine 1 is constructed of a well-known internal combustion engine such as a gasoline engine, a Diesel engine, an LPG engine or a gas turbine engine. On the other hand, the first motor generator 2 is provided with a power running function for transforming an electric energy into a mechanical energy, and a regenerating function for transforming a mechanical energy into an electric energy. Moreover, the crankshaft of the engine 1 and the drive shaft of the first motor generator 2 are connected to a torque composing unit 3.

This torque composing unit 3 is constructed of a well-known clutch mechanism. The torque, as outputted from at least one of the engine 1 and the first motor generator 2, is transmitted through the torque composing unit 3 to an automatic transmission 4. The torque thus inputted to the automatic transmission 4 is further transmitted through a torque converter to a speed change gear unit which is composed mainly of a planetary gear mechanism.

Moreover, the speed change gear unit executes a speed change by applying/releasing frictional engagement elements such as clutches and/or brakes. These frictional engagement elements are controlled by hydraulic control elements such as a shift solenoid valve and/or a manual valve, as mounted in the automatic transmission 4. Thus, the torque, as outputted from the output shaft of the automatic transmission 4, is transmitted through a front differential 5A and a front drive shaft 5B to front wheels 5C.

On the rear portion of the vehicle, on the other hand, there is mounted a second motor generator 5D. This second motor generator 5D is provided with functions similar to those of the first motor generator 2. Moreover, the torque of the second motor generator 5D is transmitted through a rear differential 5E and a rear drive shaft 5F to rear wheels 5G.

Figure 5:
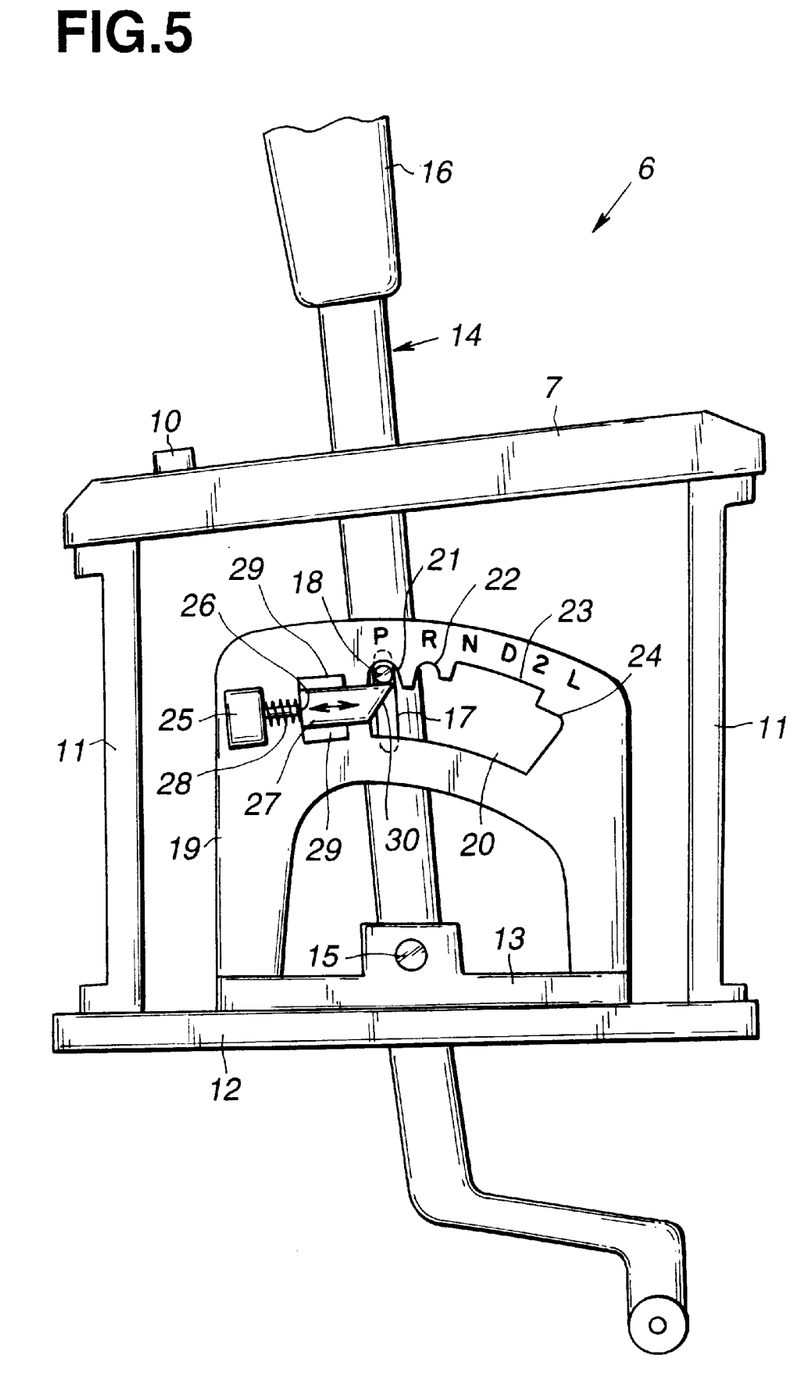
FIG. 5 is a side elevation showing one embodiment of a shift unit to be employed in the present invention.
Figure 6:
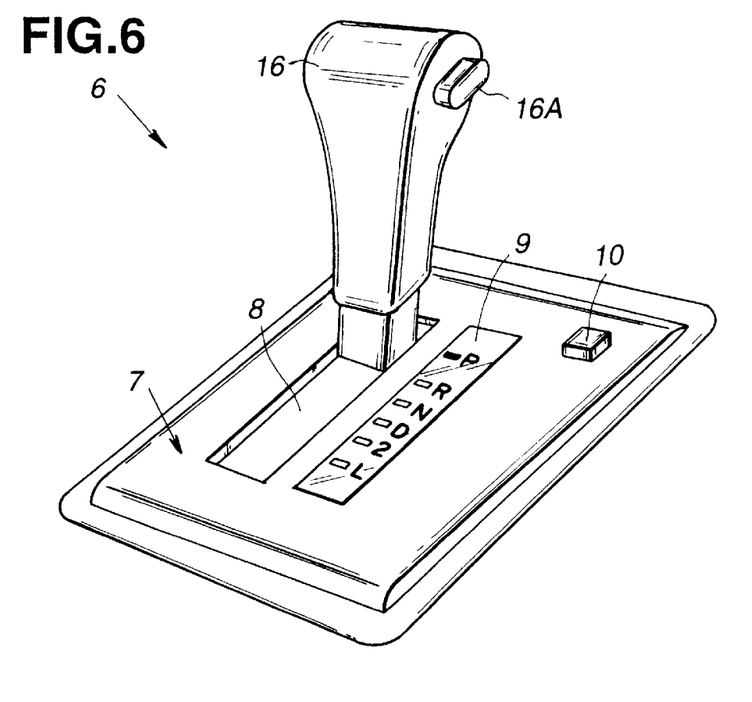
FIG. 6 is a perspective view showing the shift unit of FIG. 5.

To the aforementioned automatic transmission 4, there is connected a shift unit 6, as shown in FIGS. 5 and 6. As this shift unit 6 is operated by the driver, the automatic transmission 4 can be changed between a non-running state and a running state. The shift unit 6, as adopted in this embodiment, is of the floor shift type and is arranged in the vicinity of the (not-shown) console box in the compartment.

The construction of the automatic transmission 4 will be described in the following. First of all, a plate-shaped upper housing 7 is provided with a slide hole 8, an indicator 9 for indicating a shifting position of the automatic transmission 4, and a shift lock release button 10. In the indicator 9, there are displayed letters indicating the non-running ranges for controlling the automatic transmission 4 in the non-running state, in which no torque is outputted, such as a parking (P) and a neutral (N), and letters indicating the running ranges for controlling the automatic transmission 4 in the running state, in which the torque is outputted, such as a reverse stage (R), a drive (D), a second speed (2) and a first speed (L).

Below the upper housing 7, on the other hand, there is fixed through a frame 11 a shift lever plate 12 which has a base 13 fixed on its upper face. Into the slide hole 8, there is inserted a shift lever 14 which has a lower portion extended through the (not-shown) opening of the shift lever plate 12 to below the shift lever plate 12. Moreover, the shift lever 14 is hinged to swing on a shift lever lock pin 15 which is fitted in the base 13.

On the upper portion of the shift lever 14, there is fixed a shift lever knob 16 carrying a shift button 16A. To the lower portion of the shift lever 14, on the other hand, there is linked the (not-shown) shift linkage which is connected to the automatic transmission 4. In the shift lever 14, moreover, there is formed a guide hole 17, as extended vertically of FIG. 5. In the guide hole 17, there is movably fitted a grooved pin 18 which is actuated by the operation of the shift button 16A. The grooved pin 18 is urged at all times upward of FIG. 5 by the action of a spring which is fitted in the shift lever 14.

On the aforementioned base 13, there is erected a detent plate 19 which has a hole 20 for receiving the grooved pin 18 movably. In the upper edge portion, as seen in FIG. 5, of the hole 20 of the detent plate 19, there are formed: a notch 21 corresponding to the parking (P); a notch 22 corresponding to the reverse stage (R); a notch 23 corresponding to the neutral (N), the drive (D) and the 2nd speed (2); and a notch 24 corresponding to the first speed (L).

On the side of the detent plate 19, there is mounted a shift lock solenoid 25 which forms an essential component of a shift lock mechanism. To the leading end of the plunger 26 of the shift lock solenoid 25, there is connected a shift lock plate 27. This shift lock plate 27 is urged toward the hole 20 by a compression spring 28 and is so held that it can move along a pair of guides 29 arranged in parallel. Moreover, a slope 30 is formed on the free end side of the shift lock plate 27.

Thus, when the shift lever 14 is set in the parking position so that the shift lock plate 27 halts below the grooved pin 18, the grooved pin 18 does not come out from the notch 21 even if the shift button 16A is operated, but the shift lever 14 is fixed in the parking position.

On the other hand, when the shift lock solenoid 25 is energized so that the shift lock plate 27 is retracted leftward of FIG. 5 against the elastic force of the compression spring 28, the grooved pin 18 can be extracted from the notch 21 by the operation of the shift button 16A so that another range can be set by the operation of the shift lever 14.

Incidentally, when the range is to be shifted to the parking range from another, the shift button 16A is released at the instant when the grooved pin 18 comes into abutment against the slope 30. Then, the grooved pin 18 is raised by the elastic force of the spring so that the shift lock plate 27 is pushed toward the shift solenoid 25 so that the grooved pin 18 is moved in the notch 21 to set the parking range. There is further provided the (not-shown) mechanism which is enabled to bring the shift lock plate 27 into the shift solenoid 25 independently of the action of the shift solenoid 25 by operating the shift lock release button 10 even when the shift lever 14 is fixed in the parking position.

Figure 7:
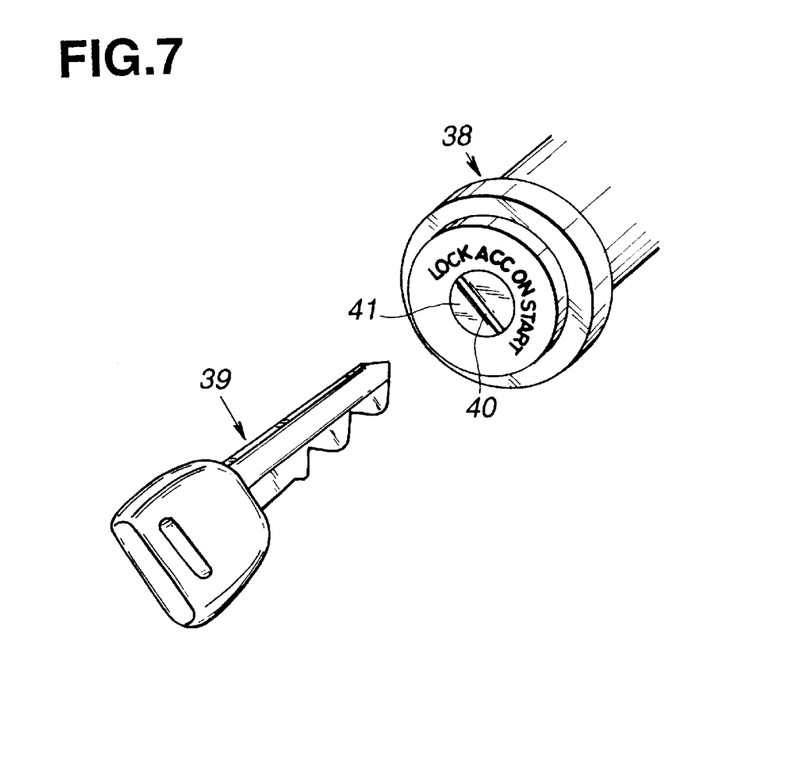
FIG. 7 is a schematic perspective view showing a key cylinder and an ignition key which are to be employed in the present invention.

FIG. 7 is a perspective view showing an ignition mechanism, as connected with a later-described ignition switch 35. In a key cylinder 38 of this ignition mechanism, there is rotatably fitted a rotor 41 which has an insertion slit 40 for receiving an ignition key 39. The rotor 41 is provided with active positions for lock (LOCK), acceleration (ACC), on (ON) and start (START) operations. Moreover, the key cylinder 38 is provided with the well-known key interlock function for enabling the ignition key 39 in the locking (LOCK) position to be inserted/retracted so long as the shift lever 14 is set in the parking position. Moreover, the ignition key 39 is returned to the ON position, if it is released after having been inserted and operated to the starting position.

Figure 8:
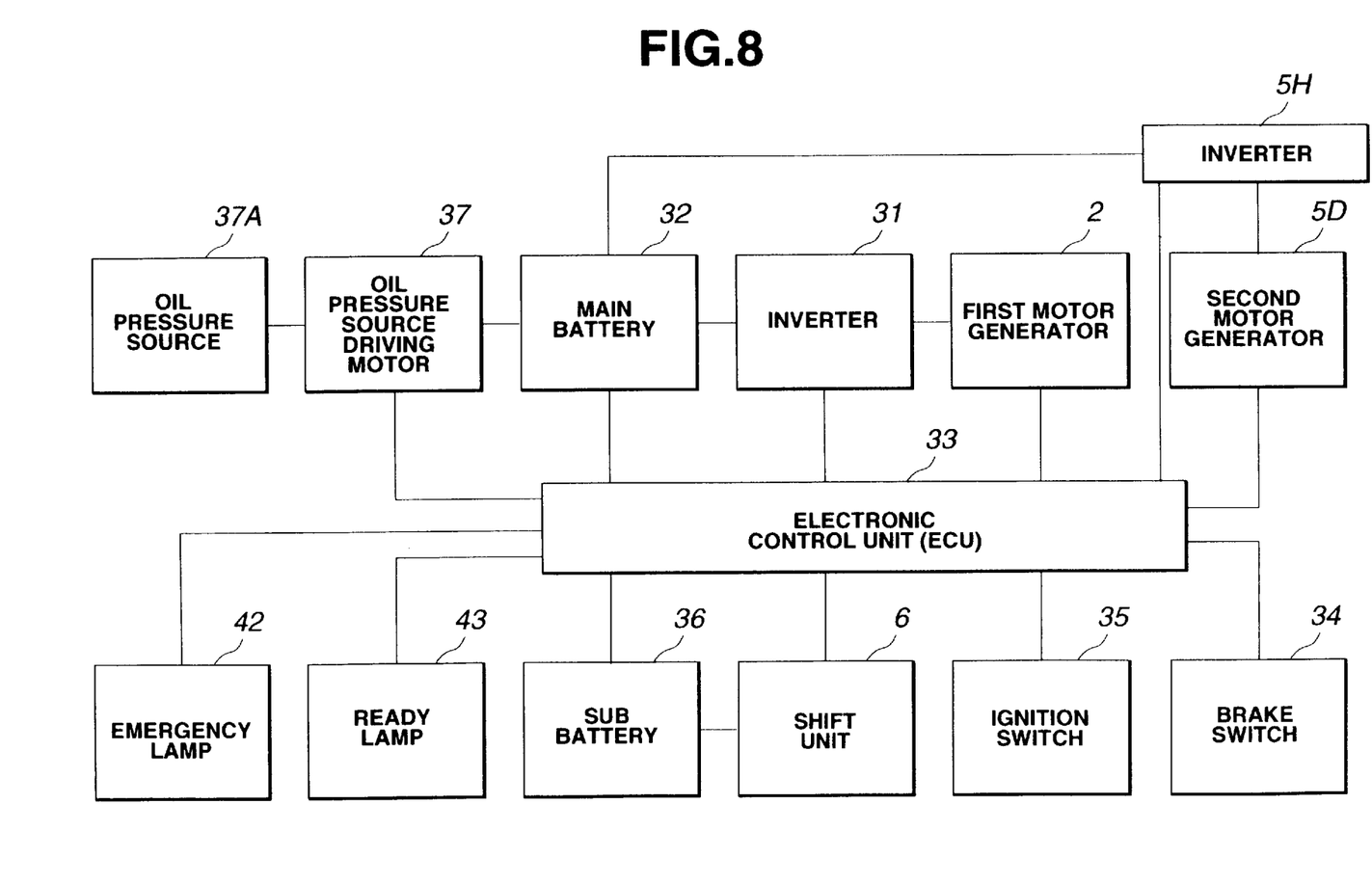
FIG. 8 is a block diagram showing an essential system construction of the present invention.

FIG. 8 is a block diagram showing an essential system construction of the present invention. With the first motor generator 2, there is connected through an inverter 31 a main battery 32, the DC current of which is transformed into an AC current by the inverter 31 until it is fed to the first motor generator 2. With the second motor generator 5D, on the other hand, there is connected through the inverter 5H the main battery 32, the DC current of which is transformed into an AC current by the inverter 5H until it is fed to the second motor generator 5D.

Moreover, the engine 1, the first motor generator 2, the second motor generator 5D, the automatic transmission 4, the inverter 31 and the inverter 5H are controlled by an electronic control unit 33. The electronic control unit 33 is constructed of a microcomputer which is composed mainly of a central processing unit (CPU), a memory (RAM and ROM) and an input/output interface.

The electronic control unit 33 is fed with the throttle opening signal of the engine 1, the signal of the engine water temperature sensor, the signal of the pattern select switch of the automatic transmission 4, the output shaft RPM signal of the automatic transmission 4, the voltage signals of the inverter 31 and the inverter 5H, the signal of a brake switch 34, the signal of the ignition switch 35 of the ignition mechanism, the signal of the shifting position switch of the shift unit 6, and so on. From the electronic control unit 33, on the other hand, there are outputted control signals to the engine 1, the automatic transmission 4, the inverter 31, the inverter 5H, the first motor generator 2, the second motor generator 5D, the shift lock solenoid 25 and so on. Moreover, the electronic control unit 33 is provided with a self-diagnosing (i.e., diagnosis) function for checking whether or not the entire system is normally acting on the basis of the signals, as fed from the various sensors.

With the electronic control unit 33, there is further connected a sub battery 36 which is used for an accessory such as the wiper. Moreover, the main battery 32 is connected with an oil pressure source driving motor 37 for actuating an oil pressure source 37A for the automatic transmission 4. This oil pressure source 37A is composed of a pump for controlling the frictional engagement elements of the automatic transmission 4 with its oil pressure.

The stopped/standby/starting states of the engine 1, the first motor generator 2 and the second motor generator SD are controlled by the manual operation of a driving power source selecting switch, as connected with the electronic control unit 33, on the basis of the running state of the vehicle, as detected by the electronic control unit 33, and on the basis of the active states of the ignition mechanism, the shift unit 6, the brake pedal and the accelerator pedal.

Here, the stopped state of the first motor generator 2 or the second motor generator 5D implies that no torque is outputted from the output shaft even if the accelerator pedal is depressed because no power is supplied from the main battery 32. The standby state implies that the torque is to be outputted from the output shaft when the accelerator pedal is depressed because the power is supplied from the main battery. The starting state implies that the torque is being outputted from the output shaft with the accelerator pedal being depressed.

In the electronic control unit 33, on the other hand, there is stored a shift pattern to be used for controlling the speed change of the automatic transmission 4, so that the shift solenoid valve and the lockup clutch control valve of the automatic transmission 4 are controlled on the basis of the running state of the vehicle, as detected by the various sensors.

With the electronic control unit 33, moreover, there are connected an EMERGENCY lamp 42 for indicating a failure of the system, and a READY lamp 43 for indicating that the engine 1, the first motor generator 2 and the second motor generator 5D are controlled into their standby states.

An example of the control for starting the vehicle equipped with the aforementioned system will be described with reference to FIG. 1. Incidentally, FIG. 2 is a diagram showing the operating states of the system components under the control of FIG. 1. First of all, with the shift lever 14 being set in the parking position, as shown in FIGS. 5 and 6, the ignition key 39 is inserted into the insertion slit 40 by the driver. At this instant: the switch of the circuit between the sub battery 36 and the electronic control unit 33 is OFF; the switches of the circuits between the main battery 32 the inverters 31 and 5H are OFF; and the switch of the circuit between the oil pressure source driving motor 37 and the main battery 32 is OFF. As a result, the first motor generator 2 and the second motor generator 5D are stopped. The states of these components are also kept when the ignition key 39 is operated to the accessory position.

When the ignition key 39 is then operated to the ON position, the switch between the electronic control unit 33 and the sub battery 36 is turned ON to start the electronic control unit 33. In this meanwhile, the switch between the main battery 32 and the oil pressure source driving motor 37 is also turned ON. The electronic control unit 33 executes, when thus started, the self-diagnosis (at Step 1) of the function of the entire system.

If the self-diagnosis reveals that no failure is in any of the system components, the data are read (at Step 2) on the basis of the signals, as inputted to the electronic control unit 33. Moreover, the oil pressure source driving motor 37 is started (at Step 3) to actuate the oil pressure source of the automatic transmission 4. Then, it is decided by the electronic control unit 33 (at Step 4) whether or not the ignition key 39 has been operated to the starting state, i.e, to the starting position. This decision is made depending upon whether or not a flag $F_{ST}$ is set at "1". Incidentally, the ignition key 39 is returned to the ON position after having been operated to the starting position.

If the answer of Step 4 is "YES", the switches between the main battery 32 and the inverters 31 and 5H are turned ON (at Step 5) while deeming that the driver is ready for the start. It is also decided (at Step 6) by the electronic control unit 33 whether or not the inverter 31 and the inverter 5H are in the starting state. Specifically, it is decided whether or not the inverters 31 and 5H are ready for driving the motor generators 2 and 5D. This decision is made on the basis of the voltage signals of the individual inverters 31 and 5H.

If the answer of Step 6 is "YES", a flag $F_{EG}$ for allowing the start of the engine 1 is set to "1" (at Step 7). This flag $F_{EG}$ is so logicized in another (not-shown) subroutine that it never fails to be checked at the starting time of the engine 1, and is canceled when the ignition key 39 is turned OFF.

It is then decided (at Step 8) by the electronic control unit 33 whether or not the state of charge (i.e., SOC) of the main battery 32 is no less than a predetermined value $V_0$. If the answer of Step 8 is "YES", it is decided (at Step 9) by the electronic control unit 33 whether or not the shift lever 14 is in the parking (P) range, whether or not a flag $F_{ST}$ indicating that the ignition key 39 is operated to the starting position is set to "1", and whether or not the brake pedal is depressed so that a brake signal (BK) is ON. If the answer of Step 9 is "YES", a shift lock release signal is outputted (at Step 10) from the electronic control unit 33. After this, the control routine is returned.

As a result, the shift solenoid is energized by the sub battery 36 so that the plunger 26 is retracted leftward of FIG. 5 to release the shift lock. As a result, the setting position of the shift lever 14 can be changed from the parking range to another running range such as the drive range. Specifically, when the accelerator is depressed in the shifted state to the running range, the first motor generator 2 is started so that its output torque is transmitted through the torque composing unit 3 to the automatic transmission 4, whereas the second motor generator 5D is started so that its torque is transmitted to the rear differential 5E.

If the answer of Step 4 or Step 9 is "NO", the routine returns to Step 2. If the answer of Step 6 is "NO", on the other hand, the self-diagnosing function makes an output (at Step 11) to the diagnosis, and it is indicated in the instrument panel in the compartment of the vehicle that the inverter 31 is not in the starting state yet, until the routine returns to Step 2.

If the answer of Step 8 is "NO", moreover, the first motor generator 2 and the second motor generator 5D cannot be driven. It is, therefore, decided (at Step 12) by the electronic control unit 33 whether the shift lever 14 is set in the parking or neutral range. If the answer of Step 12 is "YES", the engine 1 is driven to transmit its output torque through the torque composing unit 3 to the first motor generator 2 so that the motor generator 2 is functioned as a power generator to charge the main battery 32 with the electric energy, as generated, (at Step 13). In short, the charging routine is executed.

With engine 1 being driven, the routine advances to Step 9. As a result, the vehicle is driven by the output torque of the engine 1. Incidentally, if the answer of Step 12 is "NO", the routine advances directly to Step 9. The operation of Step 9 corresponds to the drive detecting means of the present invention, and the operation of Step 10 corresponds to the shift lock control means of the present invention.

Figure 1:
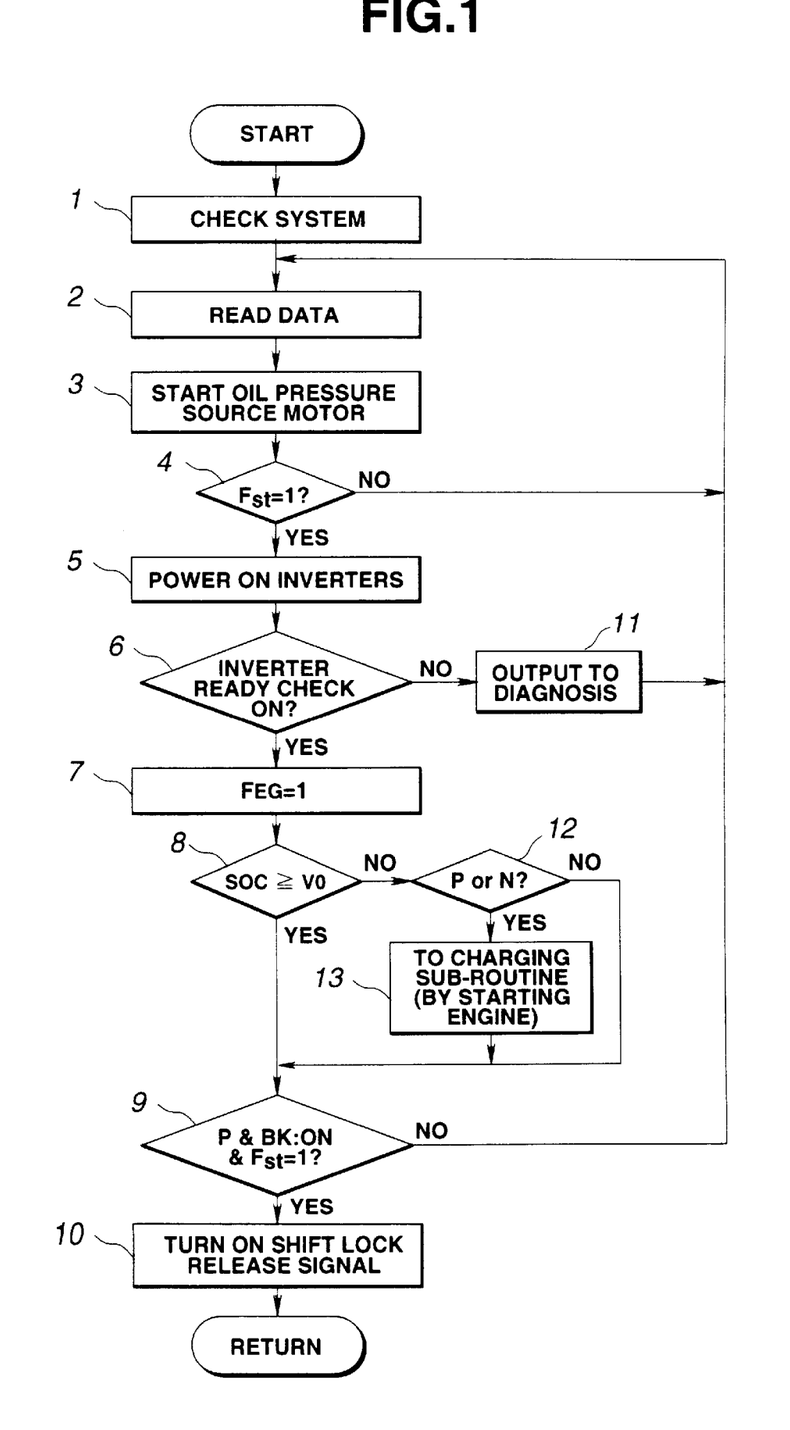
FIG. 1 is a flow chart showing one control example of the present invention.
Figure 2:
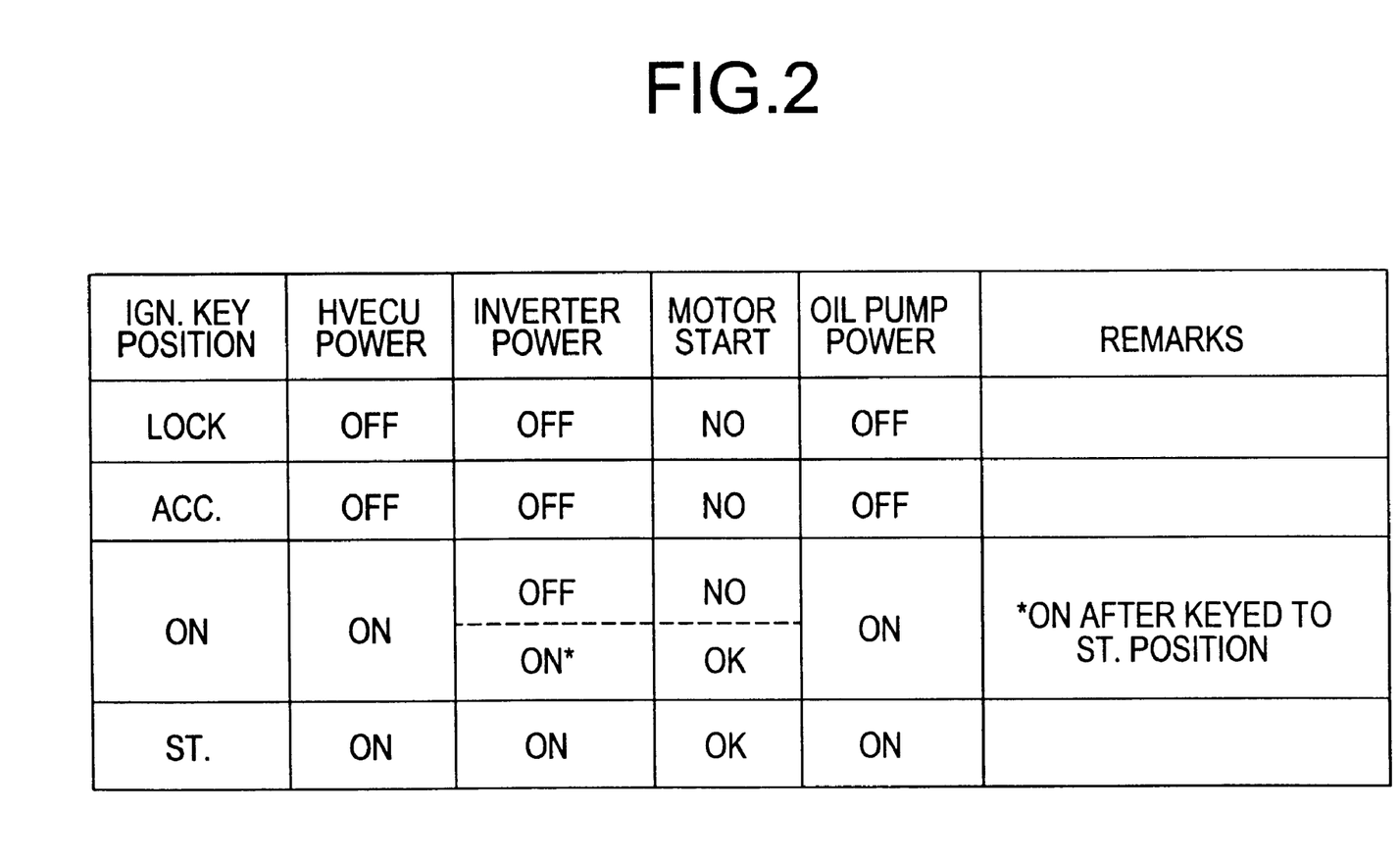
FIG. 2 is a diagram showing the active states of a system construction in the control example of FIG. 1.

Thus, according to the control example of FIG. 1, the shift lever 14 can be changed from the parking position to another running range position only with the first motor generator 2 and the second motor generator 5D or the engine 1 being in the driving state, with the shift lever 14 being set in the parking position, and with the braking pedal being depressed. Therefore, when the driver forgot to operate the ignition key 39 to the starting position, he cannot change the shift lever 14 to the running range. Then, the driver can instantly perceive that the first motor generator 2 and the second motor generator 5D are in the non-driving state so that he can eliminate the useless operation of the shift lever 14 thereby to improve the operability.

In this embodiment, moreover, if the ignition key 39 is operated to the ON position, the oil pressure source driving motor 37 is started. As a result, even if the vehicle is run immediately after the ignition key 39 was operated to the starting position, the oil pressure of the oil pressure source 37A of the automatic transmission 4 can be set to a sufficiently high level so that the acting characteristics of the frictional engagement components of the automatic transmission 4 can be improved to effect a smooth speed change control.

Figure 3:
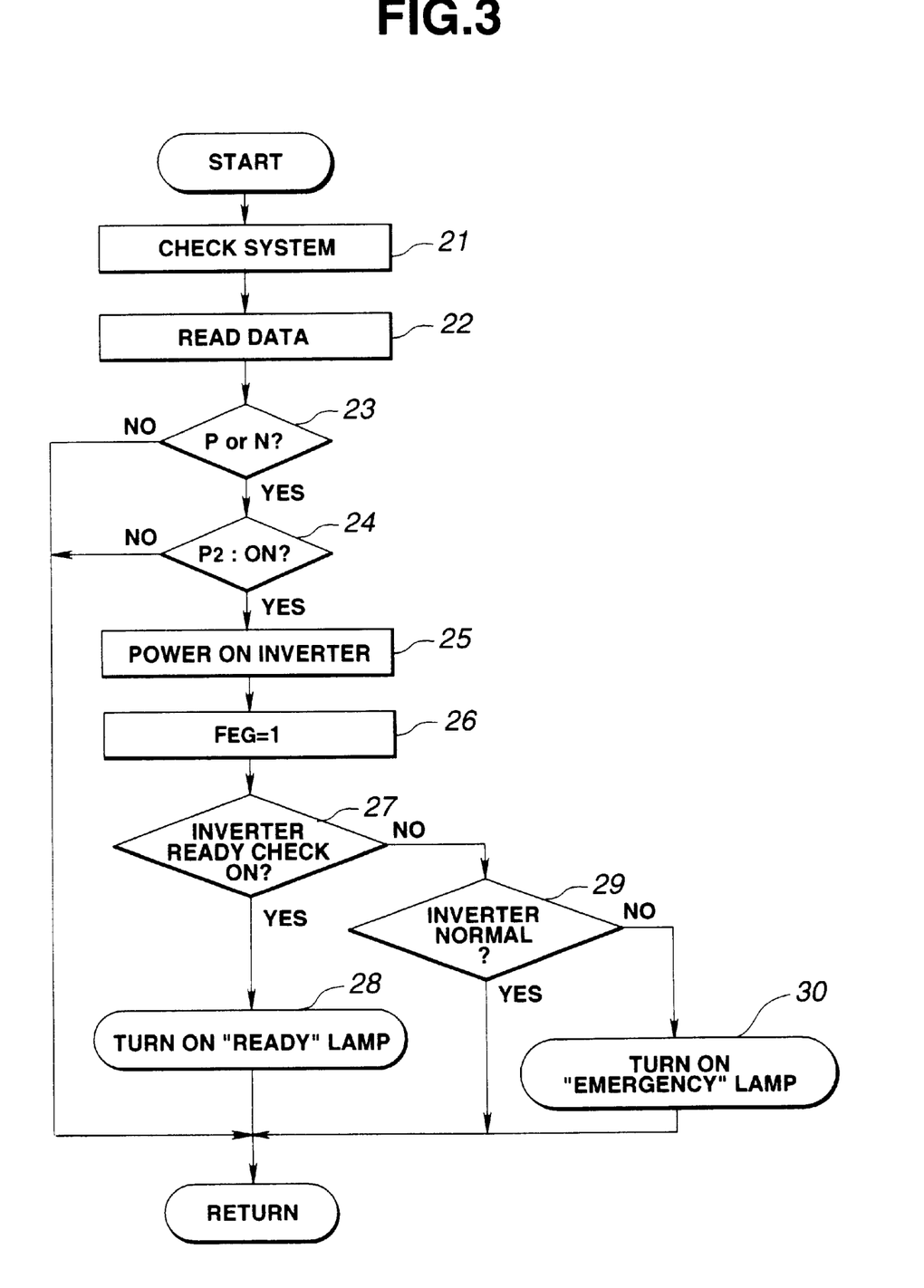
FIG. 3 is a flow chart showing one example of another control routine of the present invention.

Another example of the start control according to the present invention will be described in the following. FIG. 3 is a flow chart for explaining the start control example, in which the inverters are brought into the standby state unlike the foregoing example by a shifting operation to the running range. Specifically, the system check (at Step 21) including the detection of a failure of the system and the reading of data (at Step 22) are executed as in the aforementioned control example shown in FIG. 1. On the basis of the read data, moreover, it is decided (at Step 23) whether the range, as set in the automatic transmission 4, is the parking (P) range or the neutral (N) range.

If the answer of Step 23 is "NO", e.g., if the vehicle has already run, this control routine is ended because the starting operation is unnecessary. If the answer of Step 23 is "YES", it is decided (at Step 24) whether or not the operation of changing the shift unit 6 from the non-running range to the running rage has been executed. The decision of this Step 24 is made on the basis of the ON/OFF of a signal $P_2$, as outputted from the shift unit 6 by pushing the shift button 16A.

The shift unit 6 is equipped with the shift lock mechanism which will not release the shift lock, unless the brake pedal is depressed at the shifting time, so that the shift button 16A cannot be pushed. Therefore, the operation of Step 24 also decides whether or not the brake pedal has been depressed.

If the answer of Step 24 is "NO", that is, if the aforementioned signal $P_2$ is OFF, the shift lever 14 is kept in the state of the non-running range, and the intention of the driver is to keep the vehicle stopped. Thus, this control routine is ended.

If the answer of Step 24 is "YES", on the other hand, the driver has a demand to start the vehicle and may change the shift lever 14 to the running range. Therefore, the switch between the main battery 32 and the inverter 31 is turned ON so that the power is supplied (at Step 25) from the main battery 32 to the inverter 31 thereby to control the first motor generator 2 in the standby state.

After this, the flag $F_{EG}$ for allowing the start of the engine 1 is set to "1" (at Step 26). The control at this Step 26 is identical to that of Step 7, as shown in FIG. 1.

It is then decided (at Step 27) whether or not the inverter 31 has been prepared for rotating the output shaft of the first motor generator 2. The control content of this Step 27 is identical to that of Step 6 or Step 7 of FIG. 1. If the answer of Step 27 is "YES", the READY lamp 42 is turned ON (at Step 28) to indicate that the engine 1 is in the start-allowable state and that the first motor generator 2 is in the starting state. Then, this control routine is ended. The foregoing operations of Step 21 to Step 28 correspond to the electric motor control means of the present invention.

If the answer of Step 27 is "NO", on the other hand, it is decided (at Step 29) by the electronic control unit 33 whether or not the inverter 23 is normal. This control routine is ended if the answer of Step 29 is "YES". If the answer of Step 29 is "NO", on the other hand, the EMERGENCY lamp 43 is turned ON (at Step 30) to warn the driver, and this control routine is ended.

According to the control example of FIG. 3, as has been described hereinbefore, it is decided that the start demand by the driver is satisfied, if the ignition key 20 is operated to the ON position, if the brake pedal is depressed and if the range is changed from the non-running range to the running range. With this decision, the first motor generator 2 is controlled to the standby state, and the engine 1 is controlled to the start-allowable state.

As a result, even when the driver forgot to operate the ignition key 39 to the starting position, he may change the shift lever 14 from the non-running range to the running range while depressing the brake pedal, and then may return the brake pedal and depress the accelerator pedal. Then, the first motor generator 2 is started to output the torque thereby to start the vehicle. Simultaneously with this, the control may be made to start the engine 1.

As a result, the redoing of the range changing operation of the shift lever 14 and the operation of the ignition key 39 to the starting position can be omitted, so that the vehicle can be promptly started by the output torque of the first motor generator 2 by the simple operation to depress the accelerator pedal.

When the ignition key 39 is not operated to the ON position, no power is supplied from the main battery 32 so that the control routine is naturally ended. As a result, when the ignition key 39 is extracted from the key cylinder 38 or when the ignition key 39 is turned to the lock position or the accessory position after the vehicle was once stopped and changed to the non-running range, the first motor generator 2 is controlled in the stopped state. If the aforementioned start demand is satisfied again, the first motor generator 2 is controlled in the standby state so that the vehicle can be started reliably without any physical disorder.

Incidentally, even if the start demand is satisfied in this control routine so that the first motor generator 2 is controlled to the standby state, the vehicle may not be started accidentally, because no torque is outputted from the output shaft of the first motor generator 2 so long as the accelerator pedal is not depressed.

In this start control system, on the other hand, if the ignition key 39 is operated to the starting position with the shift lever 14 being set in the parking range, either the start control of the engine 1 or the standby control of the first motor generator 2 is naturally executed.

On the other hand, the decision of Step 24 of FIG. 3, that is, the decision of the operation to change the range from the non-running range to the running rage may be made either by using both the signal $P_2$ to be outputted by depressing the shift button 16A and the changing signal (or the shifting position signal) for changing the shift lever 14 to the running range or by using only the changing signal for changing the shift lever 14 to the running range.

Incidentally, in the control example of FIG. 3, the stopped/standby states of the second motor generator 5D can be controlled in parallel with the control of the first motor generator 2. Moreover, at least one of the first motor generator 2 and the second motor generator 5D is driven on the basis of the running conditions of the vehicle. Therefore, when only one motor generator is driven, the driving state is decided only on the motor generator to be driven.

Although the present invention has been described in connection with its specific embodiments, it should not be limited thereto but can also be applied to the start control of a vehicle equipped with a motor having only a power running function. The present invention can further be applied to the start control of a two-wheel drive vehicle in which the output of an electric motor is applied to only the front wheels or the rear wheels. In addition, the present invention can also be applied to a vehicle having only an electric motor mounted as a driving power source. Moreover, the shift unit to be employed in the present invention can adopt the well-known column shift.

Here will be synthetically described the advantages to be obtained from the present invention. According to the control system of the present invention, while the driver inserts the ignition key into the key cylinder but does not operate it to the starting position, the electric motor does not enter into the starting state, nor can be set the shift unit in the running range position, so that the vehicle can be kept in the stopped state. This incapability of changing the shift unit can inform the driver of the fact that the key operation for bringing the electric motor into the starting state is not executed. Specifically, the driver is mechanically required to switch the shift unit into the running range after operating the ignition key to the starting position. This requirement compensates the intrinsic procedure to shift the automatic transmission into the running range after the run starting state was satisfied. As a result, it is possible without fail to prevent the maloperation at the start of the electric car or hybrid car, the run standby state of which cannot be perceived from noises or vibrations.

According to the start control system of the present invention, moreover, the ignition key is operated to the intermediate position even when it is not operated to the starting position, and the electric motor is controlled to the standby state when the shift unit is changed to the running range. As a result, it is possible to omit the redoing of the range changing operation of the shift unit and the operation of the ignition key to the starting position, so that the torque can be outputted from the output shaft of the electric motor only by the simple operation to depress the accelerator pedal thereby to start the vehicle promptly.

What is claimed is:

1. A start control system for a vehicle comprising:
    an ignition key for outputting a starting signal when operated to a starting position;
    an automatic transmission
    a shift unit for changing said automatic transmission between a non-running range and a running range;
    a shift lock mechanism for selectively blocking the change from said non-running range to said running range
    an electric motor acting as a vehicular driving power source, wherein the automatic transmission is connected to an output side of the electric motor;
    start detecting means for detecting that said ignition key is operated to the starting position; and
    shift lock releasing means for releasing the block in the change of said shift unit from the non-running range to the running range by said shift lock mechanism, when the operation of said ignition key to the starting position is detected by said start detecting means.

2. A start control system according to claim 1,
    wherein said shift lock releasing means includes means for releasing the block of said shift unit from the non-running range to the running range by said shift lock mechanism, when a braked state of said vehicle is detected.

3. A start control system according to claim 1,
    wherein said electric motor includes a motor generator having a power running function for outputting a torque for driving said vehicle, and a regenerative function for generating an electric power when forced to rotate.

4. A start control system according to claim 1, further comprising:
    a hydraulic mechanism for generating an oil pressure for said automatic transmission when said ignition key is operated to the starting position.

5. A start control system according to claim 1, further comprising:
    an internal combustion engine acting as a driving power source for said vehicle;
    drive control means brought into a state capable of controlling the drive of said electric motor when said ignition key is operated to the starting position;
    standby state detecting means for detecting that said drive control means comes into the state capable of controlling the drive of said electric motor; and
    allowance means for allowing the start of said internal combustion engine when said standby state detecting means the drive controllable state of said electric motor by said drive control means.

6. A start control system according to claim 5,
    wherein said drive control means includes an inverter.

7. A start control system according to claim 1, further comprising:
    an internal combustion engine acting as a driving power source for said vehicle;
    a battery for supplying a power to said electric motor;
    voltage detecting means for detecting that the charging voltage of said battery is no more than a preset level; and
    means for starting said internal combustion engine when it is detected by said voltage detecting means that the charging voltage of said battery is no more than the preset level,
    wherein said electric motor includes a motor generator for generating a power when driven by said internal combustion engine.

8. A start control system according to claim 7, further comprising:
    means for allowing the start of said internal combustion engine when the non-running range is set by said shift unit.

9. A vehicle start control system which has: an electric motor for running the vehicle, an automatic transmission connected to the output side of said electric motor; a shift unit for changing said automatic transmission between a non-running range and a running range; and an ignition mechanism having an insertion position, for receiving an ignition key, a starting position for controlling said electric motor in a standby state, and an intermediate position between said insertion position and said starting position, comprising:
    electric motor control means for controlling said electric motor in the standby state when said ignition key is operated to said intermediate position and when said shift unit is changed to the running range.

10. A start control system according to claim 9, further comprising:
    a shift lock mechanism for allowing said shift unit to change from the non-running range to the running range while said vehicle is being braked.

11. A start control system according to claim 9, further comprising:
    a button mechanism operated when the range is changed from the non-running range to the running range;

a switch mechanism for outputting a signal when said button mechanism is operated; and means for detecting the change of said shift unit to the running range on the basis of the signal outputted from said switch mechanism.

12. A start control system according to claim 9, further comprising:

means for detecting that said shift unit is changed to said running range on the basis of a shift position signal to be outputted in response to the range selected by said shift unit.

13. A start control system according to claim 9, further comprising:

an internal combustion engine acting as a driving power source for said vehicle; and means for allowing the start of said internal combustion engine on the basis of the fact that said electric motor is controlled in the standby sate by said electric motor control means.

14. A start control system according to claim 9, wherein said electric motor includes a motor generator having a power running function for outputting a torque for driving said vehicle, and a regenerative function for generating an electric power when forced to rotate.

15. A start control system according to claim 9, further comprising:

drive control means for controlling the drive state of said electric motor.

16. A start control system according to claim 15, further comprising:

failure detecting means for detecting a failure of said drive control means;

first indication means for indicating when no failure is detected by said failure detecting means; and second indication means for indicating an emergency when the failure is detected by said failure detecting means.

* * * * *